Sept. 20, 1966 O. C. STANLEY 3,274,494

SEARCH GENERATOR

Filed Feb. 27, 1963

INVENTOR.
OLIVER C. STANLEY

BY

Knox & Knox 3,274,494
SEARCH GENERATOR

Oliver C. Stanley, San Diego, Calif., assignor to The Ryan Aeronautical Company, San Diego, Calif.

Filed Feb. 27, 1963, Ser. No. 261,312
4 Claims. (Cl. 325—420)

This invention relates generally to frequency tracking loops and particularly to a circuit for automatic signal detection and tracking.

*Background*

Automatic frequency control circuits are well known in the art. Examples are circuits used in superheterodyne and frequency modulation receivers for keeping the local oscillator at a specific frequency relative to an input signal and an intermediate frequency. Similar circuits are used in frequency modulation transmitters for stabilizing the carrier or center frequency.

Another type of automatic frequency control circuit is used in frequently tracking loops to tune a local oscillator through a band of frequencies, locking in with a signal with changing frequency or stopping upon detecting a signal of fixed frequency.

The instant invention is a combination of the two general types of circuits discussed above, providing automatic tracking through a band of frequencies and local oscillator stabilization at a single frequency.

*Objects*

It is a principal object of this invention to provide a frequency tracking circuit capable of detecting and tracking a signal with changing frequency.

It is another object of this invention to provide a frequency tracking circuit having a stable frequency characteristic dependent on the frequency of an input signal.

It is still another object of this invention to provide a frequency tracking circuit having an automatic, linear sweep characteristic with inappreciable flyback time.

It is yet another object of this invention to provide a frequency tracking circuit having stable frequency band upper and lower limits.

Finally, it is an object of this invention to provide automatic frequency control of a local oscillator in combination with the aforesaid objects.

With these and other objects definitely in view, this invention consists in the novel combination and arrangement of elements as will be hereinafter fully described in the specification, particularly pointed out in the claims, and illustrated in the drawings that form a material part of this disclosure, and in which:

*Detailed description*

Figure 1:
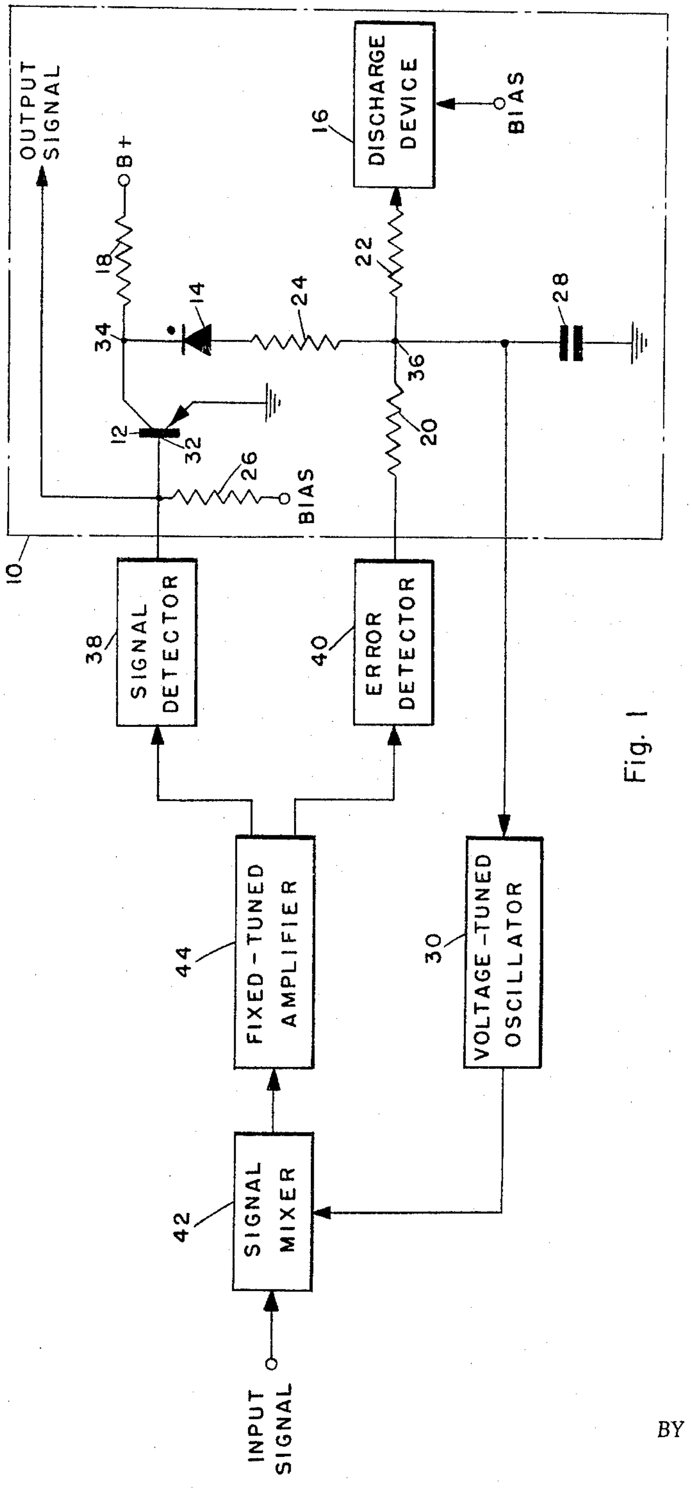
FIGURE 1 is a block-schematic diagram of a receiver in which the schematic portion illustrates the invention.
Figure 2:
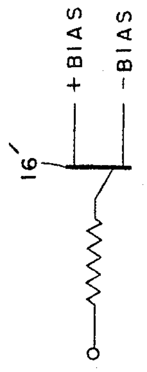
FIGURE 2 shows one embodiment of a discharge portion of the invention.
Figure 3:
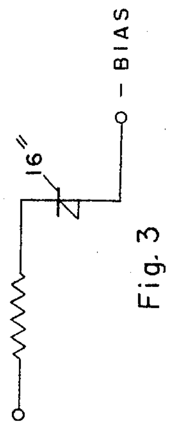
FIGURE 3 shows another embodiment of a discharge portion of the invention.

Although the invention is the combination disclosed and claimed, the area of principal novelty may be considered as being in the structure within the dashed block 10 of FIGURE 1. Semiconductor device 12 may be a junction, point contact, or similar type of transistor. Semiconductor device 14 is a Zener diode having high resistance below a rated breakdown or avalanche voltage and low resistance above said rated voltage. Discharged device 16 may be a unijunction transistor as illustrated in FIGURE 2 or a 4-layer semiconductor diode as illustrated in FIGURE 3, each having high resistance when cut off and low resistance when conducting. The level between cutoff and conduction is determined by internal characteristics and the applied bias voltage. Resistors 18–26 are conventional resistance elements, while capacitor 28 is a tuning element in voltage tuned oscillator 30. Capacitor 28 may be a semiconductor device with a variable voltage-capacitance characteristic.

Normally, with no input signal applied, transistor 12 is cut off by bias voltage applied to base 32 through resistor 26. With no current flowing through load resistor 18, full B+ voltage is applied at point 34, exceeding the breakdown voltage of Zener diode 14, and causing Zener diode 14 to conduct through resistor 24, charging capacitor 28.

When the voltage at point 36 created by the charge in capacitor 28 exceeds the opposing bias voltage applied to discharge device 16, discharge device 16 conducts and discharges capacitor 28 practically instantaneously.

Capacitor 28 charges along the linear portion of the charge curve and discharges abruptly at a point on the linear portion. The charge-discharge pattern therefore creates a sawtooth wave form. This sawtooth voltage wave form sweeps voltage tuned oscillator 30 through a band of frequencies as capacitor 28 charges, each sweep terminating abruptly and flying back to start another sweep as capacitor 28 discharges.

When an input signal of appropriate polarity from signal detector 38 exceeds the opposing bias voltage applied to base 32, transistor 12 conducts and the voltage drop across load resistor 18 lowers the voltage at point 34, cutting off Zener diode 14, and interrupting the charging current for capacitor 28. As a result, as long as an input signal is present at base 32 of transistor 12, the charge on capacitor 28 remains constant and voltage tuned oscillator 30 remains at a single frequency.

With an input signal present as described, if the input signal frequency or voltage tuned oscillator 30 frequency changes, an error signal output from error detector 40 charges or discharges capacitor 28 through resistor 20, dependent on error signal polarity and changes the frequency of voltage tuned oscillator 30 until the error signal disappears. Thus it is apparent that the system provides automatic frequency control for voltage tuned oscillator 30 if the oscillator frequency is unstable and automatic tracking of an input signal if the input signal frequency is changing.

In FIGURE 1, signal mixer 42 is a type well known to the art in which the input signal and the local signal from voltage tuned oscillator 30 are mixed, providing an output that may be the sum of the two frequencies or the difference between them. Likewise, fixed-tuned amplifier 44 is a typical bandpass amplifier designed to pass the mixer output signal with a narrow fixed band of frequencies. Error detector 40 may be a frequency discriminator of any suitable design known to the art with center frequency coinciding with the center frequency of fixed-tuned amplifier 44. Signal detector 38 also may be of any suitable type dependent on the modulation characteristics of the input signals. The output of signal detector 38 provides the useful output of the system as well as the signal that stops automatic searching.

From the foregoing description, it is apparent that the instant invention provides simple and reliable means in a novel combination for controlling automatically a local oscillator frequency, searching automatically a frequency band with stable, fixed limits, and remaining tuned to the single frequency of an input signal or tracking automatically an input signal of changing frequency.

It is understood that minor variation from the form of the invention disclosed herein may be made without departure from the spirit and scope of the invention, and that the specification and drawing are to be considered as merely illustrative rather than limiting.

I claim:

1. In an automatic frequency tracking circuit, apparatus comprising:

an oscillator having tuning means including a voltage variable tuning capacitor, so that changing voltage applied to said capacitor changes the frequency of the oscillator;

a first charging circuit connected to charge said capacitor when an input signal to the charging circuit is absent, said first charging circuit including a transistor having an emitter connected to ground, a collector connected through a series load resistor to a D.C. source, and a base connected to the output of a signal detector, whereby said transistor is cut off when said signal detector has no output and conducts when said signal detector has an output, a zener diode connected to said collector, and a resistor connected in series with said zener diode and said tuning capacitor, whereby said zener diode conducts and said tuning capaictor charges when said transistor is cut off, and said zener diode is cut off, interrupting the charging circuit, when said transistor conducts;

a second charging circuit connected to charge and discharge said capacitor when an input signal to said first charging circuit is present; and a discharge circuit connected to discharge said capacitor when the charge from said first charging circuit reaches a predetermined magnitude.

2. Apparatus according to claim 1 in which said second charging circuit comprises a resistor connected in series with said tuning capacitor and the output of a frequency error detector, whereby said tuning capacitor charges and discharges according to the polarity of an output signal from said frequency error detector.

3. Apparatus according to claim 1 in which said discharge circuit comprises:

a resistor having one end connected to said tuning capacitor; and a unijunction transistor having an emitter connected to the other end of said resistor, a first base connected to a D.C. bias of one polarity, and a second base connected to a D.C. bias of opposite polarity whereby said bias is adjusted to cut off said transistor and said transistor conducts, discharging said tuning capacitor, when the charge in said tuning capacitor reaches a predetermined maximum voltage.

4. Apparatus according to claim 1 in which said discharge circuit comprises:

a resistor having one end connected to said tuning capacitor; and a four-layer semiconductor diode having one terminal connected to the other end of said resistor and the other terminal connected to a D.C. bias source whereby said bias is adjusted to cut off said diode and said diode conducts, discharging said tuning capacitor, when the charge in said tuning capacitor reaches a predetermined maximum voltage.

References Cited by the Examiner

UNITED STATES PATENTS 2,838,671 6/1958 Miller et al. -------- 325—423 X

KATHLEEN H. CLAFFY, *Primary Examiner.*

ROBERT H. ROSE, *Examiner.*

R. LINN, *Assistant Examiner.*